United States Patent
Muth

(10) Patent No.: US 11,722,327 B2
(45) Date of Patent: Aug. 8, 2023

(54) CONTROLLER AREA NETWORK CONTROLLER AND TRANSCEIVER

(71) Applicant: NXP B.V., Eindhoven (NL)

(72) Inventor: Matthias Berthold Muth, Stelle (DE)

(73) Assignee: NXP B.V., Eindhoven (NL)

( * ) Notice: Subject to any disclaimer, the term of this patent is extended or adjusted under 35 U.S.C. 154(b) by 33 days.

(21) Appl. No.: 17/302,730

(22) Filed: May 11, 2021

(65) Prior Publication Data
US 2021/0377060 A1 Dec. 2, 2021

(30) Foreign Application Priority Data
May 26, 2020 (EP) .................................. 20176642

(51) Int. Cl.
- *H04L 25/02* (2006.01)
- *H04L 12/12* (2006.01)
- *H04L 12/40* (2006.01)

(52) U.S. Cl.
CPC .............. *H04L 12/12* (2013.01); *H04L 12/40* (2013.01); *H04L 2012/40215* (2013.01)

(58) Field of Classification Search
CPC ..... H03K 19/0005; H03K 19/00; H03M 9/00; H04L 25/028; H04L 25/0262; H04L 2012/40215; H04L 12/40013; H04L 25/02; H04L 12/40; H04L 25/0272; H03F 2200/387; H03F 3/26; H04B 1/38
USPC ...................................................... 370/438
See application file for complete search history.

(56) References Cited

U.S. PATENT DOCUMENTS

| 6,529,037 B1 * | 3/2003 | Haycock | H04L 25/0276 326/26 |
| 8,041,865 B2 * | 10/2011 | Bruennert | G06F 13/4086 710/104 |
| 8,391,318 B2 * | 3/2013 | Hartwich | H04L 7/0331 370/294 |

(Continued)

FOREIGN PATENT DOCUMENTS

| EP | 3 373 526 A1 | 12/2018 |
| EP | 3 445 003 A1 | 2/2019 |

OTHER PUBLICATIONS

Kim. G. et al. "Ringing Suppression in a Controller Area Network With Flexible Data Rate Using Impedance Switching and a Limiter", IEEE Transactions on Vehicular Technology, vol. 68, No. 11, pp. 10679-10686 (Nov. 2019).

*Primary Examiner* — Man U Phan

(57) ABSTRACT

A Controller Area Network, CAN, transceiver comprising: two terminals for coupling to a CAN bus; a transmitter arrangement configured to transmit signalling on the bus based on transmit data, the transmitter arrangement configured to drive the bus to a dominant state or recessive state based on the transmit signal; an impedance control device; a signalling detector to determine the length of time the transmit data comprises a logic zero prior to a transition to a logic one state and: based on the length of time being longer than a predetermined threshold, provide for control of an output impedance by the impedance control device in accordance with a first scheme; and based on the length of time being shorter than said predetermined threshold, provide for one of: control of said output impedance in accordance with a second scheme; and no control of the output impedance by the impedance control device.

14 Claims, 5 Drawing Sheets

(56) References Cited

U.S. PATENT DOCUMENTS

| | | | |
|---|---|---|---|
| 8,542,069 B2* | 9/2013 | Kelling | H04L 7/033 |
| | | | 710/60 |
| 8,819,327 B2* | 8/2014 | Hartwich | H04L 12/413 |
| | | | 710/315 |
| 9,606,948 B2* | 3/2017 | Monroe | G06F 13/364 |
| 10,318,465 B2* | 6/2019 | Walker | H04L 12/4135 |
| 10,425,361 B2* | 9/2019 | Daugherty, III | H04L 49/205 |
| 10,530,612 B2* | 1/2020 | Pannwitz | H04L 12/40 |
| 10,693,435 B2* | 6/2020 | Shapiro | H03H 7/20 |
| 10,791,002 B2* | 9/2020 | de Haas | H04L 69/18 |
| 10,824,583 B2 | 11/2020 | Muth et al. | |
| 10,964,996 B2* | 3/2021 | Kim | H01P 5/04 |
| 11,038,508 B2* | 6/2021 | de Haas | H04L 25/028 |
| 11,133,957 B2* | 9/2021 | Portillo | H04L 12/40 |
| 11,146,419 B2* | 10/2021 | Walker | H04L 12/40013 |
| 11,206,154 B2* | 12/2021 | Sonnek | H04L 12/2836 |
| 2017/0180152 A1* | 6/2017 | Cink | H04L 12/40013 |
| 2018/0205572 A1 | 7/2018 | Kishigami et al. | |
| 2021/0175887 A1* | 6/2021 | Hiemstra | H03K 19/018585 |

* cited by examiner

CONTROLLER AREA NETWORK CONTROLLER AND TRANSCEIVER

CROSS-REFERENCE TO RELATED APPLICATIONS

This application claims the priority under 35 U.S.C. § 119 of European patent application no. 20176642.5, filed on May 26, 2020, the contents of which are incorporated by reference herein.

FIELD

The present disclosure relates to a controller area network (CAN) node transceiver. It also relates to each of a CAN node comprising a CAN controller and a CAN transceiver and a method of operating the controller or transceiver.

BACKGROUND

CAN networks provide communication between nodes over a bus. Nodes that are connected to the bus can transmit to and receive data from other nodes that are connected to the bus. A CAN network implements the CAN protocol for defining the communication between the nodes.

SUMMARY

According to a first aspect of the present disclosure there is provided A Controller Area Network, CAN, transceiver comprising:
 two bus terminals for coupling said transceiver to a CAN bus;
 a transmitter arrangement configured to transmit signalling on the CAN bus via said bus terminals based on transmit data received at a transmit input, the transmit input comprising a terminal for coupling to a CAN controller, the transmitter arrangement comprising at least one transmitter configured to drive the bus to a dominant state or to a recessive state based on the transmit signal, and comprising an impedance control device connected to the two bus terminals;
 a signalling detector configured to detect signalling from the controller received at the transmit input with the transmit data, the signalling detector configured to determine the length of time the transmit data comprises a logic zero state prior to a transition in the transmit data from said logic zero state to a logic one state and:
 based on the length of time being longer than a predetermined threshold, provide for control of an output impedance by the impedance control device in accordance with a first scheme comprising the controlling the output impedance to be within a predefined range of an impedance value at the dominant state while a differential driver voltage on a CAN bus connected to the CAN transceiver decreases to a predefined voltage and then increasing the output impedance over a first predetermined time duration; and
 based on the length of time being shorter than said predetermined threshold, provide for one of: control of said output impedance in accordance with a second scheme different to the first scheme; and no control of the output impedance by the impedance control device.

In one or more embodiments, the signalling detector comprises a time filter configured to provide a switching signal based on said length of time being one of longer or shorter than the predetermined threshold, wherein the signalling detector further comprises a multiplexer configured to receive said switching signal and, based on the switching signal, switch between:
 a first state in which the multiplexer is configured to connect a first control block to provide signalling to the impedance control device for provision of the first scheme; and
 a second state in which the multiplexer is configured to either: connect a second control block to provide signalling to the impedance control device for provision of the second scheme; or disconnect the first control block from the impedance control device.

In one or more embodiments, based on the length of time being shorter than said predetermined threshold, the signalling detector is configured to provide for control of said output impedance in accordance with the second scheme.

In one or more embodiments, the transmitter arrangement comprises a first transmitter configured apply a voltage at the bus terminals to increase the potential difference between the at least two wires of the bus to the dominant state and a second transmitter configured apply a voltage at the bus terminals to decrease the potential difference between the at least two wires of the bus towards the recessive state, wherein:
 based on the length of time being shorter than said predetermined threshold, the signalling detector is configured to deactivate the second transmitter.

In one or more embodiments, the predetermined threshold is less than 125 ns.

In one or more embodiments, the first scheme comprises, within a recessive bit duration initiated by said transition, which causes the transmitter arrangement to drive the bus from the dominant state to the recessive state:
 controlling the impedance control device to provide an output impedance to be within the predefined range of an impedance value at the dominant state while the differential voltage on the CAN bus decreases to the predefined voltage representative of the recessive state within a first predetermined duration of time (t0 to t1); and
 subsequently, increasing the output impedance of the impedance control device to a characteristic impedance of the CAN bus while the differential driver voltage on the CAN bus is kept at the predefined voltage within a second predetermined duration (t2 to t3) of time after the first predetermined duration of time and maintaining the output impedance of the impedance control device to the characteristic impedance of the CAN bus for a third predetermined duration of time (t3 to t4); and
 and subsequently, increasing the output impedance of the CAN transceiver (220, 420) from the characteristic impedance of the CAN bus to a higher ohmic value while the differential driver voltage on the CAN bus is kept at the predefined voltage within a fourth predetermined duration of time (t4 to t5) after the third predetermined duration of time (t2 to t3).

In one or more embodiments, the second scheme comprises, within a recessive bit duration initiated by said transition, which causes the transmitter arrangement from the dominant state to the recessive state:
 controlling an output impedance of the impedance control device to be within the predefined range of an impedance value at the dominant state while the differential voltage on the CAN bus decreases to the predefined voltage within a first predetermined duration of time (t0 to t1) of the second scheme; and subsequently, increasing the output impedance of the impedance control device directly to a high impedance comprising an impedance higher than a characteristic impedance of the CAN bus while the differential voltage on the CAN bus is kept at the predefined voltage within a second predetermined duration (t2 to t3) of time of the second scheme after the first predetermined duration of time and maintaining the high impedance for at least a remaining part or all of the recessive bit duration.

In one or more embodiments, the impedance control device comprises an impedance bridge comprising two legs, and wherein each of the two legs comprises an adjustable pull resistor and an adjustable push resistor connected in series between a voltage supply rail and a ground rail and to a respective one of the two CAN bus terminals.

In one or more embodiments, the transceiver includes a receiver arrangement coupled to said two bus terminals and configured to receive signalling from the CAN bus, generate a digital, received data based on said signalling and provide said received data to a receive output, the receive output for coupling to the CAN controller.

In one or more embodiments, the transmitter arrangement is configured to operate at any one time in a first transmit mode or a second transmit mode, wherein in the first transmit mode the transmitter arrangement is configured to transmit said signalling with a first property and when the transmitter arrangement is in the second transmit mode the transmitter arrangement is configured to transmit said signalling with a second property, different to the first property; wherein
- based on the length of time being longer than a predetermined threshold, as determined by the signalling detector, the transmitter arrangement is configured to operate in the first transmit mode; and
- based on the length of time being shorter than a predetermined threshold, as determined by the signalling detector, the transmitter arrangement is configured to operate in the second transmit mode.

In one or more embodiments, the first property and the second property comprise one or more of:
- a first baud rate used to transmit said signalling and a second baud rate used to transmit said signalling respectively, wherein the second baud rate is greater than the first baud rate;
- a first voltage level scheme used to represent logic one and logic zero in the signalling applied to the CAN bus and a second voltage level scheme used to represent logic one and logic zero in the signalling applied to the CAN bus respectively, wherein voltage levels of the first voltage level scheme differ to the voltage levels of the second voltage level scheme.

According to a second aspect of the disclosure, we provide a Controller Area Network, CAN, controller in combination with the CAN transceiver of any preceding claim, the CAN controller comprising:
- a transmit output configured to provide transmit data to the CAN transceiver for transmission on the CAN bus;
- a receive input configured to receive received data from the CAN transceiver representative of received signalling from the CAN bus; and
- a functionality selector configured to provide a mode signal with the transmit data that instructs the CAN transceiver to operate in a second transmit mode rather than a first transmit mode and disable operation of the impedance control device in accordance with the first scheme, wherein the mode signal comprises the controller being configured to provide transmit data comprising a logic zero state having a length of time less than the predetermined threshold prior to a transition in the transmit data from said logic zero state to a logic one state.

In one or more embodiments, the CAN controller is configured to provide the transmit data at a second baud rate when the transceiver is in the second transmit mode which is greater than a first baud rate used when the transceiver is in the first transmit mode, and wherein the second baud rate is such that a bit time of the second baud rate is less than the predetermined threshold.

In one or more embodiments, the CAN controller is configured to, when the mode signal is not provided, provide the transmit data at the first baud rate wherein the first baud rate is such that a bit time of the first baud rate is greater than the predetermined threshold, which thereby provides for operation of the impedance control device in accordance with the first scheme.

According to a third aspect of the disclosure we provide a method for operating a Controller Area Network, CAN, transceiver, the CAN transceiver comprising two bus terminals for coupling said transceiver to a CAN bus and a transmitter arrangement configured to transmit signalling on the CAN bus via said bus terminals based on transmit data received at a transmit input, the transmit input comprising a terminal for coupling to a CAN controller, the transmitter arrangement comprising at least one transmitter configured to drive the bus to a dominant state or to a recessive state based on the transmit signal, and comprising an impedance control device connected to the two bus terminals; the method comprising:
- detecting, using a signalling detector, signalling from the controller received at the transmit input with the transmit data;
- determining the length of time the transmit data comprises a logic zero state prior to a transition in the transmit data from said logic zero state to a logic one state and:
- based on the length of time being longer than a predetermined threshold, providing for control of an output impedance by the impedance control device in accordance with a first scheme comprising the controlling the output impedance to be within a predefined range of an impedance value at the dominant state while a differential driver voltage on a CAN bus connected to the CAN transceiver decreases to a predefined voltage and then increasing the output impedance over a first predetermined time duration; and
- based on the length of time being shorter than said predetermined threshold, providing for one of: control of said output impedance in accordance with a second scheme different to the first scheme; and no control of the output impedance by the impedance control device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

A Controller Area Network, CAN, typically comprises a plurality of nodes each connected to a two wire CAN bus. The nodes can communicate with each other by sending and receiving signalling to and from the CAN bus.

A controller area network (CAN) is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1:2003. CAN Flexible Data-Rate or "CAN FD," which is an extension of the standardized CAN data link layer protocol and is integrated into the ISO 11898-1:2015 standard, can provide higher data rates.

Figure 1:
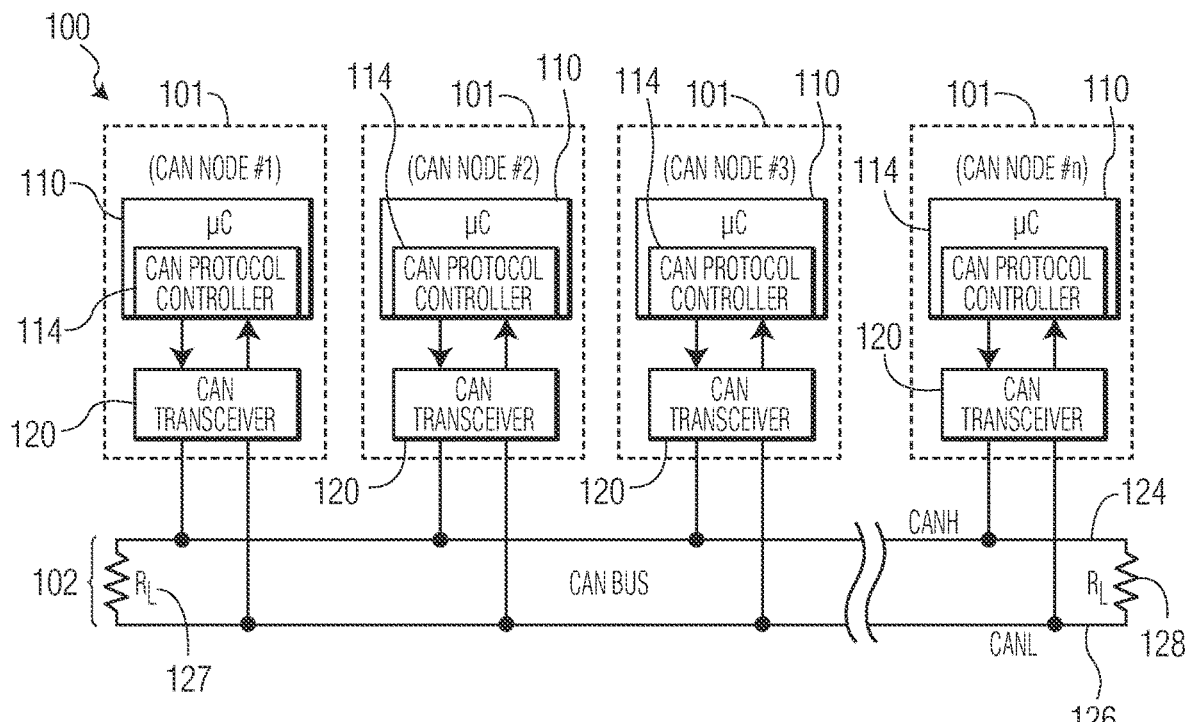
FIG. 1 shows an example of a CAN bus network with multiple nodes.
Figure 2:
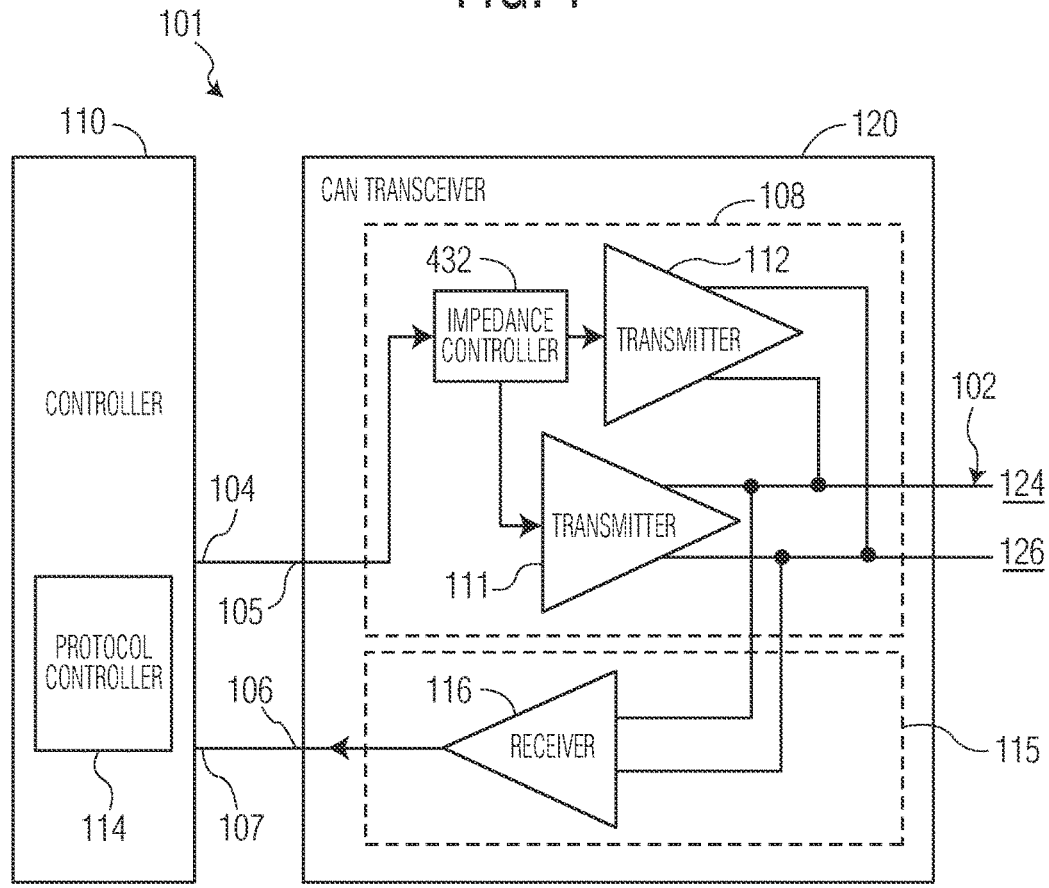
FIG. 2 shows a first example node.

FIG. 1 shows an example of a bus system or network 100 with a plurality of nodes 101 coupled to communicate via a bus 102. FIG. 2 shows an example of one of the plurality of nodes 101 in more detail and the same reference numerals have been used.

The multiple nodes 101 may also be referred to as "ECUs" or CAN nodes or CAN bus devices, each connected to the CAN bus 102. In this example, each CAN node includes a controller 110, which may comprise a microcontroller, having an embedded CAN protocol controller 114 and a CAN transceiver 120. The microcontrollers are typically connected to at least one device (not shown) such as a sensor, an actuator, or some other control device and are programmed to determine the meaning of received messages and to generate appropriate outgoing messages. The microcontrollers, also referred to as host processors, hosts, or digital signal processors (DSPs), are known in the field. In an example, the host supports application software that interacts with the CAN protocol controller.

The CAN protocol controllers 114, which can be embedded within the microcontrollers 110 or external to the microcontrollers (e.g., a separate IC device), implement data link layer operations as is known in the field. For example, in receive operations, a CAN protocol controller may store received serial bits from the transceiver 120 until an entire message is available for fetching by the microcontroller. The CAN protocol controller can also decode the CAN messages according to the standardized frame format of the CAN protocol. In transmit operations, the CAN protocol controller 114 may be configured to receive messages from the microcontroller 110 and transmit the messages as serial bits, called "transmit data" herein, in the CAN frame format to the CAN transceiver 120.

The CAN transceivers 120 are located between the controllers 110 and the CAN bus 102 and implement physical layer operations. For example, in receive operations, a CAN transceiver converts analog differential signals from the CAN bus to serial digital signals that the CAN protocol controller 114 can interpret. The CAN transceiver 120 also protects the CAN protocol controller from extreme electrical conditions on the CAN bus, e.g., electrical surges. In transmit operations, the CAN transceiver 120 converts serial digital bits of the transmit data received from the CAN protocol controller into analog differential signals that are sent on the CAN bus.

The CAN bus 102 carries analog differential signals and includes a CAN high (CANH) bus wire 124 and a CAN low (CANL) bus wire 126. The CAN bus wires may comprise a twisted pair. The CAN bus is known in the field.

Thus, with reference to example FIG. 2, the node 101 includes the controller 110, such as a microcontroller. The CAN controller 110 provides and receives signalling to/from the CAN bus 102 using a CAN transceiver 120. The CAN transceiver 120 therefore typically provides signalling to the CAN bus based on the transmit data received from the CAN controller 110 and provides received digital data to the CAN protocol controller 114 based on signalling it receives from the CAN bus 102. The CAN transceiver 120 may be configured to provide the signalling to the CAN bus 102 with the appropriate voltage levels for logic high and logic low based on the transmit data and with the appropriate differential signalling for the two-wire CAN bus according to the CAN protocol.

Reference to a CAN transceiver or a CAN controller herein may be understood as a controller and transceiver that implements, at least in part, the CAN protocol in full or in part or the CAN FD protocol in full or in part. The functionality described for the CAN transceiver or CAN controller (including its protocol controller) herein may comprise increased functionality above what is currently defined in the CAN protocol.

The CAN controller 110 is configured to provide the transmit data at a transmit output 104 for receipt at a transmit input 105 of the CAN transceiver 120. The transmit output 104 and transmit input 105 may comprise integrated circuit pins. Thus, the transmit input pin 105 is configured to receive transmit data from the CAN controller 110. The CAN transceiver 120 is configured to receive signalling from the CAN bus 102 and provide the received data (as a serial digital data stream) based on the signalling to a receive output 106 for receipt at a receive input 107 at the CAN controller 110. The receive output 106 and the receive input 107 may comprise integrated circuit pins.

The CAN transceiver 120 comprises a transmitter arrangement 108 configured to transmit signalling on the CAN bus 102 based on said transmit data. The CAN transceiver 120 also comprises a receiver arrangement 115 configured to receive signalling from the CAN bus 102 and provide received data based on the signalling.

The transmitter arrangement 108 comprises at least one transmitter and, in this example comprises two transmitters 111, 112. The first transmitter 111 may be configured to drive the bus 102 to a dominant state and therefore represent a logic 0. The second transmitter 112 may be configured to drive the bus 102 (in combination with first transmitter 111 in some examples) to the recessive state and therefore represent a logic 1. Each of the transmitters 111, 112 has two outputs to provide signalling to the two wire CAN bus 102. It will be appreciated that the dominant and recessive states are known to those skilled in the art of CAN. The receiver arrangement 115 comprises at least one receiver 116 having two inputs to receive the differential signalling from the CAN bus.

The at least one transmitter 111,112 may configured to operate in a first transmit mode or a second transmit mode, wherein in the first transmit mode the transmitter arrangement is configured to transmit said signalling with a first property and wherein in the second transmit mode the transmitter arrangement is configured to transmit said signalling with a second property. The first and second property may comprise one or more property types, such as baud rate (e.g. maximum, minimum or average baud rate), voltage level scheme, encoding scheme or other. However, for ease of explanation herein, the first and second property may comprise baud rate such that the first property comprises a first baud rate and the second property comprises a second baud rate wherein the second baud rate is higher than the first baud rate. The use of a higher baud rate may improve the rate with which data can be transmitted on the CAN bus. Nevertheless, it will be appreciated that the first and second property could (in any of the example embodiments herein) alternatively be, or additionally be, a voltage level scheme used to represent logic 0 and logic 1 on the CAN bus 102.

In this example, the transmitter arrangement 108, in the first transmit mode, is configured to transmit signalling at a lower baud rate and to transmit said signalling with a first voltage level scheme to represent logic high and logic low on the CAN bus. In this example, the transmitter arrangement 108, in the second transmit mode, is configured to transmit signalling at a higher baud rate and to transmit said signalling with a second voltage level scheme to represent logic high and logic low on the CAN bus, different to the first voltage level scheme.

The at least one receiver may be configured to operate in a first receive mode or a second receive mode, wherein in the first receive mode the receiver arrangement 115 is configured to receive signalling from the bus 102 with the first property and in the second receive mode the receiver arrangement 115 is configured to receive signalling from the bus 102 with the second property. As described above, the property may be any one or more of baud rate, voltage level scheme, encoding scheme or other.

In this example, the receiver arrangement 115, in the first receive mode, is configured to receive signalling at a lower baud rate and to receive said signalling with a first voltage level scheme to represent logic high and logic low on the CAN bus. In this example, the receiver arrangement 115, in the second receive mode, is configured to receive signalling at a higher baud rate and to receive said signalling with the second voltage level scheme to represent logic high and logic low on the CAN bus, different to the first voltage level scheme.

The first transmit mode and first receive mode may comprise a mode which is compliant with the voltage levels and timings specified by the CAN FD protocol. The second transmit mode and second receive mode may comprise a mode which is part of an extension to the CAN protocol, in which the higher baud rate is desired.

The determination of whether it is required for the transceiver 120 to operate in the second transmit mode rather than the first transmit mode may be made by the CAN controller 101. In one or more examples, it may be necessary to reliably and robustly signal this requirement to the CAN transceiver 120 and in such a way that the transmitter arrangement 108 and/or the receiver arrangement of the CAN transceiver 120 can reliably and robustly transition between the first transmit mode and second transmit mode and vice-versa.

In one or more examples, mode change signalling from the CAN controller 110 sent from the transmit output 104 and received by the CAN transceiver 120 may be used to signal the transmit mode change and/or the receive mode change. Thus, the mode change signalling may be superimposed on, embedded in, or otherwise provided with or between bits of the transmit data.

Figure 3:
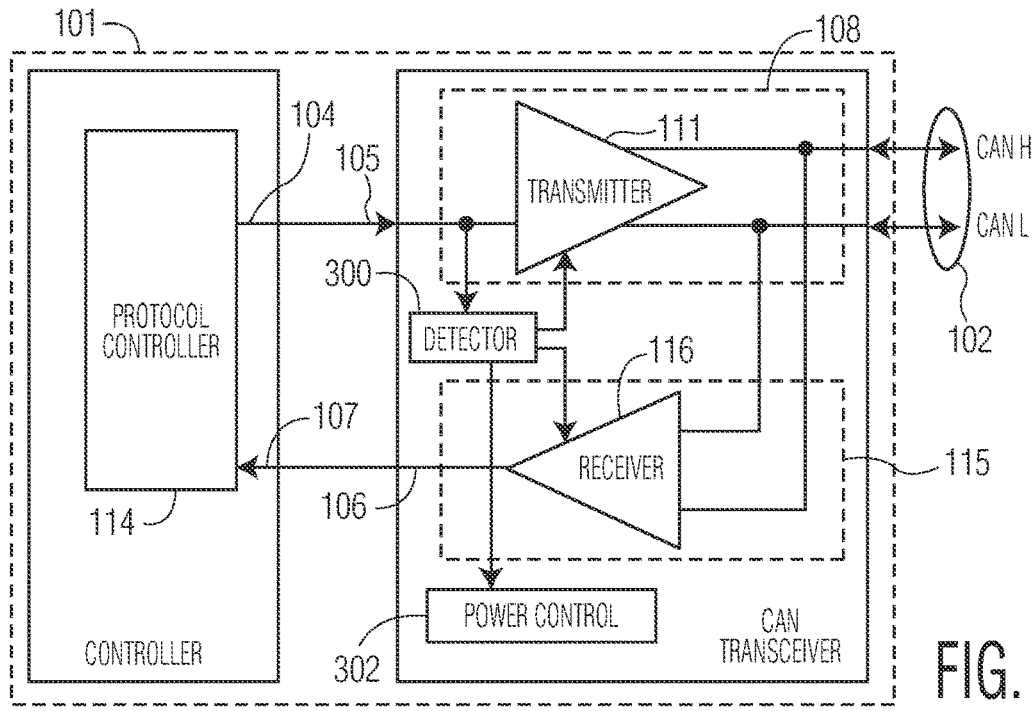
FIG. 3 shows a second example node.

Example FIG. 3 shows an example configuration of a transceiver 120 to receive the mode change signalling. In example FIG. 3, the transmitter arrangement 108 is shown having a single transmitter for simplicity.

The CAN transceiver 120 may comprise a detector 300 coupled to the transmit data input pin 105 of the transceiver 120. Further, the detector 300 may be coupled to the transmitter arrangement 108 and/or one of the transmitters 111 (only one shown in FIG. 3). The detector 300 may be coupled to the receiver arrangement 115 and/or one of the receivers 116. The detector 300 may be configured to detect the mode change signaling. The output of the detector 300 may cause the change in the transmit mode and/or the change in the receive mode in several different ways. For example, the output of the detector 300 may be configured to cause the connection of different components in the transmitter arrangement 108 to the bus and/or the connection of different components in the receiver arrangement 115 to the bus. Alternatively, or in addition, different bias voltages or power levels may be applied to one or more components of the transmitter arrangement 108 and/or the receiver arrangement 115 to provide the means to transmit and receive in accordance with the first and second properties.

The detector 300 may comprise, for example, at least one of a timer, a counter, a filter, a state machine, a sampler, and a memory.

The detector 300 may be configured to detect the mode switch signal within the serial bit stream and, in response to said detection, activate switching between the different first and second transmit modes and/or first and second receive modes. The detector 300 may be configured to detect the mode switch signal, which is, for example, superimposed on the serial bit stream of the transmit data or embedded in the serial bit stream of the transmit data. The detector may be configured to detect a plurality of switching signals that in combination form the mode switch signal provided by the controller 110 or protocol controller 114.

In example FIG. 3, the transceiver 120 of the node 101 comprises a power control 302. The power control 302 may be configured to apply one or more different bias voltages or power levels to one or more components of the transmitter arrangement 108 and/or the receiver arrangement 115 for switching between the first and second transmit modes and/or the first and second receive modes.

In the example, the detector 300 is coupled to the receiver arrangement 115, the transmitter arrangement 108 and to the power control 302. In other examples, the detector 300 may be coupled to the receiver arrangement 115 only, to the transmitter arrangement 108 only or to the power control 302 only (or only to two of those three components).

The detector 300 may be configured to activate switching between different transmit/receive modes of at least one of the transmitter arrangement 108, the receiver arrangement 115 and the power control 302 in response to the switching signal.

The mode switching between the first and second transmit and/or first and second receive modes may not be the only functionality provided by the CAN transceiver 120.

The multiple CAN nodes 101 connected to the bus 102 may be located at varying distances to terminating impedances 127, 128 at end CAN nodes (see FIG. 1). CAN nodes furthest from the terminating impedances 127, 128 may cause reflection/ringing on the CAN bus, which can reduce the maximum data rate at which the bus may operate correctly. Other factors such as the length of the CAN bus wires may also limit the data rate to a speed below the speed at which reflection would become an issue. However, advancement in the CAN bus protocol, for example, CAN FD have increased the possible data rate to a point at which reflection may negatively impact the performance of the CAN bus network. Further, it should be considered that even with a well-terminated network, high capacitance bus loading may also negatively impact the transmission rate. In the case of a high number of CAN nodes 101 connected to the CAN bus 102, the dominant to recessive transitions becomes very slow. Besides the capacitive impact, the impedance of the wires 124, 126 may vary with temperature resulting in a non-matched bus termination which again causes reflections even at the terminated ends of a CAN network. In the recessive state the transmitting node 101 is high ohmic. When each node connected to the bus 102 adds a capacitance of, for instance, a maximum of 100 pF to the CAN bus and the CAN bus impedance is fixed at 60Ω, the dominant to recessive transition will not be faster than approximately 100 ns in the case of a network to which ten nodes are connected. The more CAN nodes are connected to the CAN bus wires, the higher the overall capacitance will be and the longer the recessive bit transition will take. For complex topologies, the successful recessive bit transition reaching a reliable recessive bit level at all nodes may take several 100 ns up to e.g. 1 µs including all ringing effects. If it is desirable to have a transmission rate of 5 MBit/s or higher, the bit time is 200 ns, which may be shorter than the bit transition time and may cause communication failures.

In one or more examples, the CAN transceiver 120 may be configured to control the output impedance of the transceiver 102. By controlling the output impedance, signal reflections, ringing and any other undesirable signal artefacts on the bus may be controlled in one or more examples.

Figure 4:
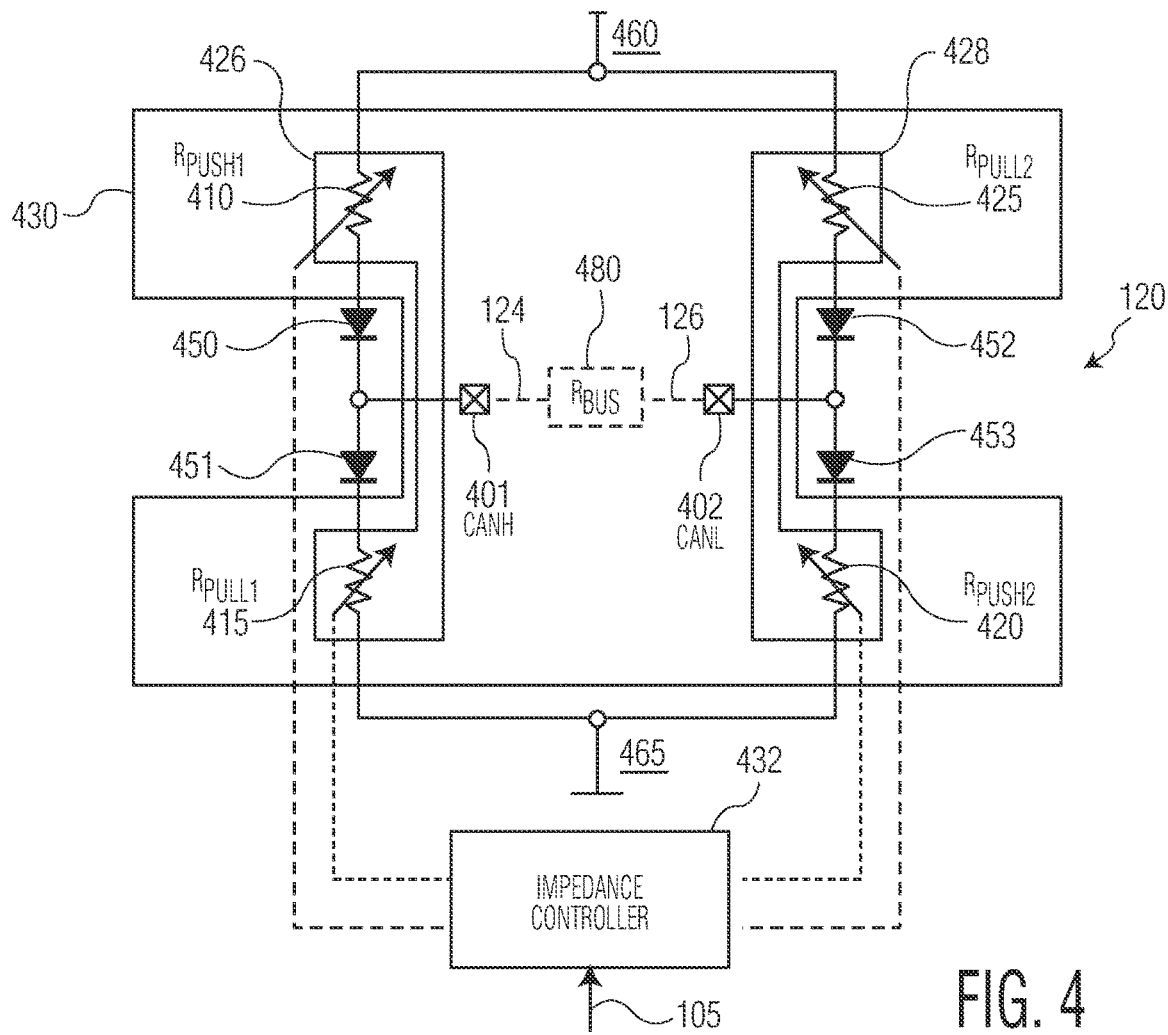
FIG. 4 shows an example transmitter arrangement of a node comprising an impedance bridge.

FIG. 4 shows an example of the disclosure that provides functionality for reducing/suppressing signal reflection/ringing that may be implemented on CAN network and CAN FD network topologies to suppress signal disturbances and to improve the signal quality. In accordance with the example, the functionality may be activated based on activation signaling from the controller 110 provided via the transmit output 104 and received, by the transceiver 120 via the transmit input pin 105. Thus, the functionality may be signaled by activation signaling in a similar way to the mode switch signaling, by using the same path as the transmit data from the transmit data output 104 to the transmit data input 105.

The transceiver 120 being configured to detect the activation signaling within the serial bit stream from the controller 110 and activate the functionality. The transceiver 120 may be configured to detect the activation signaling, which is, for example, superimposed on the serial bit stream or embedded in the serial bit stream. The activation signaling may comprise one or more pulses, but in one or more examples, may be provided by a transition of a CAN transceiver of the CAN device from a dominant state to a recessive state. In response to detecting a transition of the CAN transceiver from the dominant state to the recessive state (which may be based on detecting a logic 0 to logic 1 transition in the transmit data from the controller), an output impedance of the CAN transceiver is controlled to be within a predefined range of an impedance value at the dominant state while a differential driver voltage on a CAN bus connected to the CAN transceiver decreases to a predefined voltage. For example, the output impedance of the CAN transceiver may be controlled to be within a certain percentage above or below the impedance value at the dominant state (e.g., ±5%, ±10% or within other suitable value range of the impedance value at the dominant state) while the differential driver voltage on the CAN bus decreases to the predefined voltage. The transition of the CAN transceiver of the CAN device from the dominant state to the recessive state may be detected by monitoring the transmit data at the transmit input 105 received at the CAN transceiver and identifying a signal edge of the transmit data signal. By controlling the output impedance of the CAN transceiver to be low ohmic (e.g., be within a certain percentage above or below the impedance value at the dominant state) during the ramping down of the differential driver voltage, the energy dissipated into the CAN network can be reduced, resulting in lower reflection on the CAN bus. The CAN bus reflection suppression technique is independent of the CAN bus topology and CAN bus data speed and can be applied to various CAN bus topologies and CAN bus data speeds.

FIG. 4 depicts an embodiment of the transmitter arrangement 108 of the CAN transceiver 120 depicted in FIG. 2 or FIG. 3. In the example of FIG. 4, the CAN transceiver 120 includes an impedance bridge 430 and an impedance controller 432 configured to control the impedance bridge. By controlling the impedance bridge of the CAN transceiver 120 (e.g., based on the transmit data signal received from the transmit data input pin 105), the impedance of the CAN transceiver 120 can be adjusted independently of the signal response at the CAN bus 102. Consequently, the signal reflection/ringing at the CAN bus can be reduced or suppressed through the controlled impedance.

In the example depicted in FIG. 4, the impedance bridge 430 is connected to CANH and CANL terminals 401, 402, which in turn are coupled to the bus wires 124, 126 of the bus 102. The impedance bridge includes a first leg 426, which is also referred to as CANH (side) leg, and a second leg 428, which is also referred to as CANL (side) leg. Each leg includes two controllable impedances with impedance properties (e.g., adjustable capacitors, adjustable resistors, and/or adjustable inductors), which can be dynamically adjustable for instance by the impedance controller 432. The CANH leg includes a push impedance unit 410 (e.g., implemented as a push resistor $R_{PUSH1}$), which is connected between a common voltage supply rail $V_{CC}$ 460 and the CANH terminal 401, and a pull impedance unit 415 (e.g., implemented as a pull resistor $R_{PULL1}$), which is connected between the CANH terminal 401 and a common ground rail 465. The CANL leg includes a pull impedance unit 425 (e.g., implemented as a pull resistor $R_{PULL2}$), which is connected between the common voltage supply rail $V_{CC}$ and the CANL terminal 402, and a push impedance unit 420 (e.g., implemented as a push resistor $R_{PUSH2}$), which is connected between the CANL terminal 402 and the common ground rail. Although the impedance units 410, 415, 420, 425 are implemented as resistors in the embodiment shown in FIG. 4, in other embodiments, at least one of the impedance units 410, 415, 420, 425 may be implemented as one or more transistors (MOSFET transistors or bipolar transistors), one or more adjustable capacitors, one or more adjustable inductors, or a combination of one or more adjustable resistors, one or more capacitors, and/or one or more adjustable inductors. In some embodiments, at least one of the push resistors, $R_{PUSH1}$ and $R_{PUSH2}$, and the pull resistors, $R_{PULL1}$ and $R_{PULL2}$, is implemented as a resistor ladder or other adjustable resistor network and the impedance controller 432 can adjust the resistance value of at least one of the push resistors, $R_{PUSH1}$ and $R_{PUSH2}$, and the pull resistors, $R_{PULL1}$ and $R_{PULL2}$, (e.g., by controlling switches (e.g., MOSFET transistors or other active semiconductor devices) within a resistor ladder or other adjustable resistor network to connect or bypass a resistor component). The legs may have a symmetrical resistor configuration with respect to the CANH and CANL terminals. The CAN bus 404 has a load impedance represented by the equivalent bus impedance, $R_{BUS}$, shown schematically at 480. Typically, the bus impedance $R_{BUS}$ has an impedance of approximately 60Ω in accordance with the above described typical nominal cable impedance of 120Ω provided that the CAN bus is terminated with termination resistance $R_{Term}$=120Ω at each end. In some embodiments, diodes 450, 451, 452, 453 may be connected in series with each of the impedance units 410, 415, 420, 425 in order to prevent reverse currents from flowing from the CAN bus into the common voltage supply rail and into the common ground rail in the case that a bus voltage that is higher than the supply voltage potential $V_{CC}$ at 460 is present on the common voltage supply rail or a bus voltage that is lower than a ground potential is present on the common ground rail 465 (or other reference voltage). In some embodiments, other schemes are used to prevent reverse currents flowing from the CAN bus 102 into the common voltage supply rail and into the common ground, e.g., a diode in series with the common supply rail 460 and a diode in series with the common ground rail 465.

In some embodiments, the impedance values of the adjustable push resistors $R_{PUSH1}$ and $R_{PUSH2}$ and the adjustable pull resistors $R_{PULL1}$ and $R_{PULL2}$ are dynamically adjustable based on two parameters x and y. The domain of the parameter x may comprise the value range x=(0, 1), where x=(0, 1)={x∈$\mathcal{R}$, 0<x<1}, and the domain of the parameter y may comprise the value range y=(0, 2], where y=(0, 2]={y∈$\mathcal{R}$, 0<y≤2}. The parameters x and y are independent of each other. The push impedance value $Z_{PUSH}$ of the push resistors $R_{PUSH1}$ and $R_{PUSH2}$ can be expressed as:

$$Z_{PUSH} = \frac{R_f}{x \cdot y} \quad (1)$$

where Rf represents a reference resistance value. The pull impedance value $Z_{PULL}$ of the adjustable pull resistors $R_{PULL1}$ and $R_{PULL2}$ can be expressed as:

$$Z_{PULL} = \frac{R_f}{(1-x) \cdot y} \quad (2)$$

The total differential impedance of the impedance bridge 430, which is also the driver impedance $Z_{CAN}$ of the CAN transceiver 420, can be expressed as:

$$Z_{CAN} = 2 \cdot \frac{1}{\frac{1}{Z_{PUSH}} + \frac{1}{Z_{PULL}}} \quad (3)$$

$$Z_{CAN} = 2 \cdot \frac{R_f}{y} \quad (4)$$

The total differential impedance of the impedance bridge 430, which is the driver impedance, $Z_{CAN}$, of the CAN transceiver 420, can be dynamically adjusted to any impedance value between a low ohmic state, which is herein determined by a lowest driver impedance value $Z_{CAN}=R_f$, and a high ohmic state, which is herein represented by $Z_{CAN}=\infty$. $R_f$ is the minimum drive impedance value of the CAN transceiver 420. For instance, the minimum drive impedance value may be $R_f$=15Ω. It should be noted that a high ohmic state, referred herein by $Z_{CAN}=\infty$, may comprise a maximum drive impedance value in the range of kilo Ohms or mega Ohms (e.g. at least 1 kiloOhm or at least one MOhm). The driver impedance, $Z_{CAN}$, needs to be high ohmic compared to the equivalent bus impedance, $R_{BUS}$, in order to allow the differential bus impedance to reach the nominal value of e.g. 60 Ohms again at the end of a slow bit time. Consequently, the factor between the maximum drive impedance and the minimum drive impedance may in the range of e.g., thousand or more.

The impedance controller 432 may be implemented as a processor, such as a microcontroller. In some embodiments, the impedance controller includes a signal edge detector. In some embodiments, the impedance controller 432 is configured to detect a transition of the CAN transceiver 120 from a dominant state to a recessive state (an example of the activation signaling) and in response to detecting a transition of the CAN transceiver from the dominant state to the recessive state, control an output impedance of the impedance bridge (e.g., the impedance measured between the CANH and CANL terminals 401, 402) to be within a certain percentage above or below the impedance value at the dominant state (e.g., by simultaneously adjusting the impedance configuration of the push resistors, $R_{PUSH1}$ and $R_{PUSH2}$, and the pull resistors, $R_{PULL1}$ and $R_{PULL2}$ such that the output impedance of the impedance bridge 430 to be within a certain percentage above or below the impedance value at the dominant state while the differential output voltage decreases to a predefined voltage) while the differential driver voltage on the CAN bus 102 (e.g., the different voltage measured between the CANH and CANL terminals 401, 402) connected to the CAN transceiver decreases to a predefined voltage (e.g., 0V or other suitable voltage level). For example, the output impedance of the CAN transceiver may be controlled to be ±5%, ±10% or within other suitable value range of the impedance value at the dominant state while the differential driver voltage on the CAN bus decreases to the predefined voltage. In some embodiments, the output impedance of the CAN transceiver is controlled to be at a fixed impedance while the differential output voltage decreases to a predefined voltage. By controlling the output impedance of the CAN transceiver to be within a certain percentage above or below the impedance value at the dominant state during the ramping down of the differential driver voltage, the energy dissipated into the CAN network can be reduced, resulting in lower reflection on the CAN bus, under various CAN bus topologies and data speeds.

An active CAN transceiver (i.e., a CAN transceiver in the dominant state) drives the CAN bus waveform to a "dominant" state, represented as a logic low level (logic zero) of the transmit signal. An inactive CAN transceiver (i.e., a CAN transceiver in the recessive state) removes its differential output voltage from the CAN bus, represented as a logic high level (logic one) of the transmit signal. Although specific logic levels of the transmit signal are described, in other networks, other signal logic levels may be used. In some embodiments, the impedance controller 432 is configured to control the resistance values of the adjustable push resistors, $R_{PUSH1}$ and $R_{PUSH2}$, and the adjustable pull resistors, $R_{PULL1}$ and $R_{PULL2}$, of the impedance bridge while the differential driver voltage on the CAN bus connected to the CAN transceiver decreases to the predefined voltage. In an embodiment, during a positive/rising or negative/falling signal edge of the transmit signal, the impedance controller may adjust the resistance values of one or more of the adjustable push resistors, $R_{PUSH1}$ and $R_{PUSH2}$, and the adjustable pull resistors, $R_{PULL1}$ and $R_{PULL2}$. For example, during a dominant (falling) edge of the transmit signal, the impedance controller 432 may adjust the resistance values of the adjustable push resistors, $R_{PUSH1}$ and $R_{PUSH2}$, while keep the resistance values of the adjustable pull resistors, $R_{PULL1}$ and $R_{PULL2}$, static high ohmic to be within a certain percentage above or below the impedance value at the dominant state. In another example, during a recessive (rising) edge of the transmit signal, the impedance controller may adjust the resistance value of each of the adjustable push resistors, $R_{PUSH1}$ and $R_{PUSH2}$, and the adjustable pull resistors, $R_{PULL1}$ and $R_{PULL2}$, individually with different slopes in order to keep the overall impedance of the impedance bridge to be within a certain percentage above or below the impedance value at the dominant state.

In some embodiments, the impedance controller 432 is configured to increase the output impedance of the CAN transceiver 420 (e.g., the impedance measured between the CANH and CANL terminals 401, 402) while the differential driver voltage on the CAN bus 404 (e.g., the different voltage measured between the CANH and CANL terminals 401, 402) is kept at the predefined voltage. Because the CAN bus voltage is kept at the predefined voltage (e.g., 0V) while the output impedance of the CAN transceiver is increased, the impedance change will not result in large amount of energy dissipating into the CAN network and thus reduce or prevent a new reflection on the CAN bus. For example, at least one of the push resistors, $R_{PUSH1}$ and $R_{PUSH2}$, and the pull resistors, $R_{PULL1}$ and $R_{PULL2}$, may be implemented as a resistor ladder or other adjustable resistor network and the impedance controller can increase the resistance value of at least one of the push resistors, $R_{PUSH1}$ and $R_{PUSH2}$, and the pull resistors, $R_{PULL1}$ and $R_{PULL2}$, (e.g., by controlling switches within a resistor ladder or other adjustable resistor network to connect a resistor component). The impedance controller 423 may increase the output impedance of the CAN transceiver to be equal to a characteristic impedance of the CAN bus or to a predefined impedance value that is close to characteristic impedance of the CAN bus (e.g., ±5%, ±10% or within other suitable value range of the characteristic impedance of the CAN bus) while the differential driver voltage on the CAN bus is kept at the predefined voltage. In some embodiments, the impedance controller increases the output impedance of the CAN transceiver to be equal to a characteristic impedance of the CAN bus or to a predefined impedance value that is lower or higher than the characteristic impedance of the CAN bus before a data sample point to avoid data sample error. In some embodiments, the impedance controller increases the output impedance of the CAN transceiver to be equal to a characteristic impedance of the CAN bus while the differential driver voltage on the CAN bus is kept at the predefined voltage and subsequently, increases the output impedance of the CAN transceiver from the characteristic impedance of the CAN bus to a high ohmic value while the differential driver voltage on the CAN bus is kept at the predefined voltage.

Figure 5:
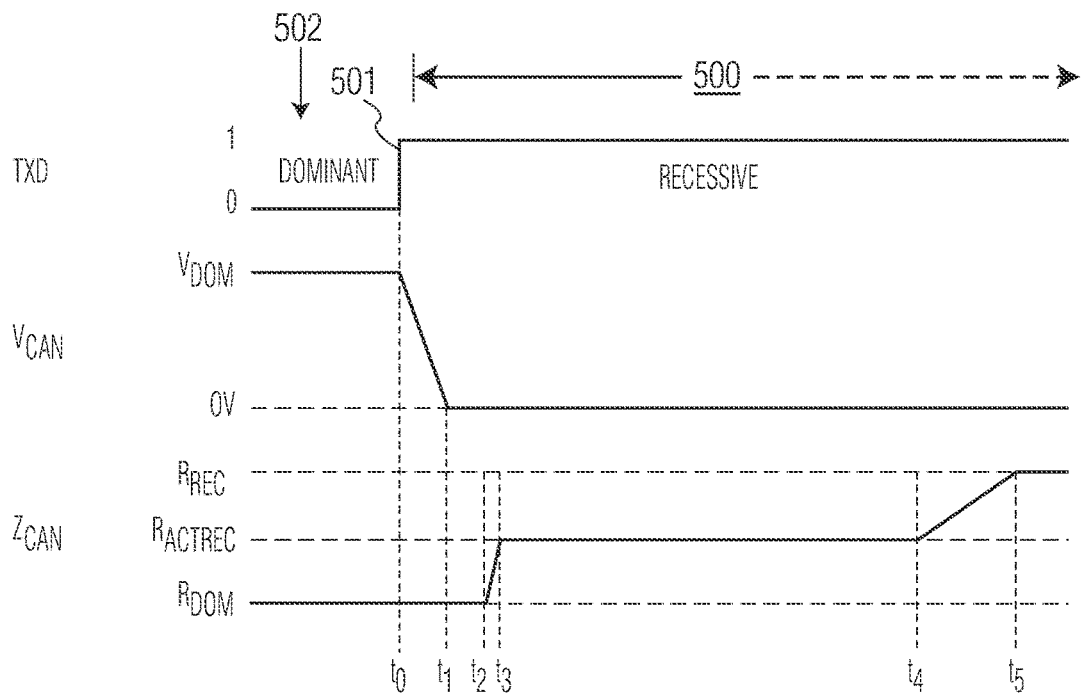
FIG. 5 shows an example signal timing diagram illustrating the operation of the transmitter arrangement depicted in FIG. 4.

FIG. 5 illustrates an example signal timing diagram of the CAN transceiver 120 depicted in FIG. 4. In the signal timing diagram illustrated in FIG. 5, the driver impedance, "$Z_{CAN}$," of the impedance bridge 430 (e.g., the impedance measured between the CANH and CANL terminals 401, 402) is controlled by the impedance controller 432 to switch between a dominant impedance level, "$R_{DOM}$," an active recessive impedance level, "$R_{ACTREC}$," and a recessive impedance level, "$R_{REC}$." The impedance values of $R_{DOM}$, $R_{ACTREC}$, and/or $R_{REC}$ may be determined based on the impedance value of the CAN bus 404. For example, if the impedance of the CAN bus is 120 ohms, the impedance value of $R_{DOM}$ may be set to 30 ohms while the impedance value of $R_{ACTREC}$ may be set to the same impedance value of the CAN bus, which is 120 ohms. The impedance value of $R_{REC}$ may be set to indefinite ($\infty$), may comprise a maximum drive impedance value, such as greater than 1 kOhms or greater than 1 MOhms.

In operation, the CAN controller 110 of the CAN node 101 (shown in FIG. 2) provides a serial bit stream to the CAN transceiver 120 for transmission on the CAN bus. The impedance controller 432 may monitor the transmit data for the activation signaling. In one or more examples, the impedance controller 432 monitors signal transitions/edges on the transmit data bit stream at transmit input 105 and adjusts the impedance value of the impedance bridge accordingly.

At time point, $t_0$, the transmit data at 105 transitions from low to high, which causes the transmitter arrangement to provide a dominant to recessive transition of the differential voltage $V_{CAN}$ on the CAN bus 404 (e.g., the different voltage measured between the CANH and CANL terminals 401, 402). It will be appreciated that the low to high transition of TXD signal on the TXD path 251 may not immediately cause a change on the CAN bus voltage $V_{CAN}$ because there may be a delay as the transmit signal received at input 105 is converted to a voltage level for the CAN bus. In the dominant state, the impedance controller 432 controls the push resistors, $R_{PUSH1}$ and $R_{PUSH2}$, to stay at a dominant impedance level (e.g., 15Ω) and the pull resistors, $R_{PULL1}$ and $R_{PULL2}$, to stay high ohmic, which results in a low ohmic driver impedance, $Z_{CAN}$, that is at the dominant impedance level, $R_{DOM}$ (e.g., 30Ω).

In response to the detection of the dominant to recessive transition at time point, $t_0$, (which comprises an example of the activation signal) the impedance controller 432 controls the push resistors, $R_{PUSH1}$ and $R_{PUSH2}$, and the pull resistors, $R_{PULL1}$ and $R_{PULL2}$, to control the driver impedance, $Z_{CAN}$, unchanged. For example, between time point, $t_0$, and time point, $t_1$, the resistance value of each of the push resistors, $R_{PUSH1}$ and $R_{PUSH2}$, and the pull resistors, $R_{PULL1}$ and $R_{PULL2}$, is changed that the CAN bus voltage, $V_{CAN}$, ramps from $V_{DOM}$ to zero while the driver impedance, $Z_{CAN}$, stays constant. The impedance controller may gradually increase the resistance values of the push resistors, $R_{PUSH1}$ and $R_{PUSH2}$, from one value (e.g., 15 Ohms) to a higher value (e.g., 30 Ohms) while decrease the resistance values of the pull resistors, $R_{PULL1}$ and $R_{PULL2}$, from "infinite" to a certain value (30 Ohms). At the time point, $t_1$, the resistance values of the push resistors, $R_{PUSH1}$ and $R_{PUSH2}$, and the pull resistors, $R_{PULL1}$ and $R_{PULL2}$, may be identifiable to each other, while the driver impedance, $Z_{CAN}$, stays constant. At time point, $t_1$, the CAN bus voltage, $V_{CAN}$, reaches the recessive state (0V) and the impedance controller controls the driver impedance, $Z_{CAN}$, unchanged from the impedance value of the driver impedance, $Z_{CAN}$, at time point, $t_0$. After the CAN bus voltage, $V_{CAN}$, reaches the recessive state (0V), the impedance controller controls the driver impedance, $Z_{CAN}$, unchanged for another time duration. By controlling the driver impedance, $Z_{CAN}$, unchanged during the ramping down of the CAN bus voltage, $V_{CAN}$, the energy dissipated into the CAN network can be reduced, resulting in lower reflection on the CAN bus 102.

At time point, $t_2$, the impedance controller 432 begins to increase the driver impedance, $Z_{CAN}$, from the low ohmic impedance of $R_{DOM}$, to a higher value until time point, $t_3$. For example, at least one of the push resistors, $R_{PUSH1}$ and $R_{PUSH2}$, and the pull resistors, $R_{PULL1}$ and $R_{PULL2}$, may be implemented as a resistor ladder or other adjustable resistor network and the impedance controller can increase the resistance value of at least one of the push resistors, $R_{PUSH1}$ and $R_{PUSH2}$, and the pull resistors, $R_{PULL1}$ and $R_{PULL2}$, (e.g., by controlling switches within a resistor ladder or other adjustable resistor network to connect a resistor component). At time point, $t_3$, the driver impedance, $Z_{CAN}$, reaches the active recessive impedance level, $R_{ACTREC}$, which may be adapted to the characteristic impedance of the CAN network cable (e.g. 120 ohm) or any other suitable value. Because the CAN bus voltage, $V_{CAN}$, is kept at 0V while the driver impedance, $Z_{CAN}$, is increased, the impedance change will not result in large amount of energy dissipating into the CAN network and thus reduce or prevent a new reflection on the CAN bus 404. The adjustment of the driver impedance, $Z_{CAN}$, may be performed continuously over time and may be increased at a constant change rate. In some embodiments, the constant change rate of the driver impedance, $Z_{CAN}$, is set to be lower than a predefined value to gradually increase the driver impedance, $Z_{CAN}$. The impedance controller can adjust the driver impedance, $Z_{CAN}$, by controlling the push resistors, $R_{PUSH1}$ and $R_{PUSH2}$, and the pull resistors, $R_{Pull1}$ and $R_{Pull2}$, to increase their impedances from a starting push impedance (e.g., $Z_{CAN}=30\Omega$) to a target push impedance (e.g., $Z_{CAN}=120\Omega$). In some embodiments, the impedance controller increases the impedances of the push resistors, $R_{PUSH1}$ and $R_{PUSH2}$, and the pull resistors, $R_{Pull1}$ and $R_{Pull2}$, continuously over time at a constant change rate. In some embodiments, the time duration between time point, t1, and time point, t2, is zero.

The reflection on the CAN bus 102 is suppressed up to time point, $t_4$. The longer the time duration between time point, $t_0$, and time point, $t_4$ is, the better the ringing suppression performance will be. At time point, $t_4$, the impedance controller 432 begins to increase the driver impedance, $Z_{CAN}$, from the active recessive impedance level, $R_{ACTREC}$, to a higher value until time point, $t_5$. At time point, $t_5$, the driver impedance, $Z_{CAN}$, reaches the recessive impedance level, $R_{REC}$. In some embodiments, the time during between time point, $t_4$, and time point, $t_5$, is above a certain time duration to reduce or prevent additional energy from dissipating into the CAN network in case the bus voltage is not zero at time point, t4. For example, the bus voltage may not be zero at time point, t4, if another transmitter is also driving the bus dominant, e.g., during arbitration or when an error frame is transmitted. The threshold time duration between t4 and t5 depends on the network topology complexity.

It will be appreciated that backward compatibility between CAN controllers and CAN transceivers that may have different functionality is important. It is also important to reliably signal the use of the functionality, that is the transmit mode and receive mode switch functionality and the impedance control functionality, from the controller 110 to the transceiver 120. In some examples, their may be conflict between backward compatibility and reliably signaling the use of the different functionality of the transceiver 120, especially when the mode switch signaling and the activation signaling is provided with the transmit data at the transmit input 105 of the transceiver.

It will be appreciated that the CAN transceivers 120 having only one of the impedance control functionality or the mode switch functionality may have been deployed and therefore there is no opportunity to modify the activation signaling or the mode switch signaling to avoid conflict when the both the impedance control functionality and the mode switch functionality is wanted together.

In one or more examples it may be desirable to reliably signal the use of different functionality to the CAN transceiver 120 while maintaining backward compatibility.

Figure 6:
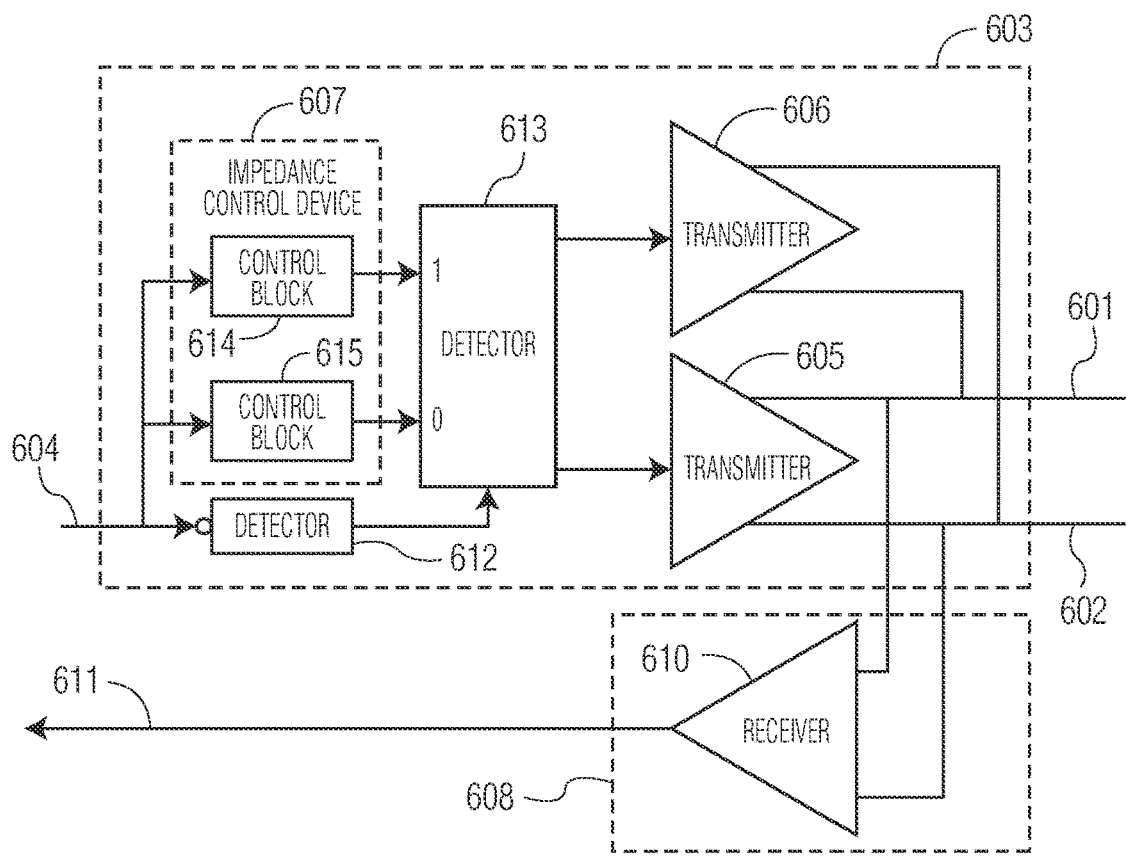
FIG. 6 shows a first example transceiver according to the disclosure.

FIG. 6 shows a CAN transceiver in accordance with the present disclosure. The transceiver 600 comprises two bus terminals 601, 602 for coupling said transceiver to a CAN bus 102. The transceiver comprises a transmitter arrangement 603 configured to transmit signalling on the CAN bus 102 via said bus terminals 601, 602 based on transmit data received at a transmit input 604. The transmit input comprises a terminal for coupling to a CAN controller (shown as 110 in the previous figures). The transmitter arrangement 603 comprises at least one transmitter configured to drive the bus to a dominant state or to a recessive state based on the transmit signal. In this and other examples the transmitter arrangement 603 comprises two transmitters 605 and 606. The first transmitter 605 may be configured to drive the bus 102 to a dominant state and therefore represent a logic 0 of the transmit data on the CAN bus. The second transmitter 606 may be configured to drive the bus 102 in combination with first transmitter 605 to the recessive state and therefore represent a logic 1 of the transmit data on the CAN bus. Each of the transmitters 605, 606 has two outputs to provide signalling to the two terminals 601, 602. The first transmitter may be termed a push transmitter because it pushes the potential different between the bus wires to the dominant state. The second transmitter may be termed a pull transmitter because it pulls the potential different between the bus wires to the recessive state.

The transmitter arrangement 603 further comprises an impedance control device 607 connected to the two bus terminals. The impedance control device 607 is configured to control the output impedance of the transceiver by control of the output impedance of the transmitter arrangement 603 at the bus terminals 601, 602. The impedance control device may be embodied as control blocks 614,615 in combination with the first and second transmitters 605, 606. The arrangement may take the form of the impedance bridge shown in FIG. 4. In such an embodiment the control blocks 607 may perform the function of the impedance controller 432. It will be appreciated that the variations in the structure of the impedance bridge described above are applicable in this embodiment. Also, it will be appreciated that means other than the impedance bridge of FIG. 4 for controlling the output impedance of the transmitter arrangement 603 and the transceiver 600 as a whole may be provided. In summary, each impedance control block 614, 615 may control both the first and second transmitters 605, 606 to control the output impedance of the transceiver while applying said dominant and recessive signalling to the bus 601, 602.

In example FIG. 6, the transceiver 600 comprises a receiver arrangement 608 coupled to said two bus terminals 601, 602 and configured to receive signalling from the CAN bus. The receiver arrangement 608 may comprise one or more receivers 610 configured to generate a digital, received data signal based on said CAN bus signalling. The received data is provided to a receive output 611, the receive output 611 for coupling to the CAN controller 110.

The transceiver 600 includes a signalling detector (combination of 612,613) configured to detect signalling from the controller 110 received at the transmit input 604 with the transmit data. The signalling detector is configured to determine the length of time the transmit data comprises a logic zero state prior to a transition in the transmit data from said logic zero state to a logic one state. Thus, in one or more examples, the signalling detector may include a time filter 612 for such a purpose.

In general, the transceiver 600 is configured to:
based on the length of time being longer than a predetermined threshold, provide for control of an output impedance by the impedance control device in accordance with a first output impedance control scheme (e.g. provided by the first control block 614); and
based on the length of time being shorter than said predetermined threshold, provide for either: (1) control of said output impedance in accordance with a second output impedance control scheme (e.g. provided by the second control block 615) different to the first scheme; and (2) no active control of the output impedance by the impedance control device (see example FIG. 7).

The impedance control schemes comprise one or more output impedance changes and maintenance of the output impedance over time while and after the transmitter arrangement 603 drives the bus to the recessive state.

The first scheme comprises, with reference to FIG. 5, the controlling of the output impedance to be within a predefined range of an impedance value ($R_{DOM}$) at the dominant state while a differential voltage $V_{CAN}$ on the CAN bus decreases to a predefined voltage, shown as 0 Volts over the time period $t_0$ to $t_1$. Thus, the predefined voltage comprises the voltage that places the bus in the recessive state (below 0.5 Volts according to the CAN protocol). The first scheme then comprises increasing the output impedance over a first predetermined time duration shown as $t_1$ to $t_5$. That is, the first predetermined time duration comprises the time taken to reach the greatest output impedance provided by the impedance control device over the bit time 500 beginning once the bus reaches the recessive state. The increase comprises a first increase to $R_{ATREC}$ over $t_2$ to $t_3$ and after a period of maintaining $R_{ATREC}$ over the directly subsequent period $t_3$ to $t_4$, performing a second increase to $R_{REC}$ over the directly subsequent period $t_4$ to $t_5$. Thus, in summary, the increase comprises two separate increases separated by a period of substantially constant output impedance over the recessive bit time 500. This first scheme is described in more detail above in the description of FIG. 5.

In one or more examples, the control of transceiver functionality based on signalling provided at the transmit input 604 with the transmit data is advantageous because the reuse of existing pins/terminals obviates the need for hardware changes. However, as the functionality of the CAN transceiver increases and a greater number of "functionality activation" signals need to be signalled to the transceiver by the CAN controller, it becomes more difficult to effectively signal activation/deactivation of functionality while maintaining backward compatibility with functionality that may have already been released. It may be desirable for CAN controllers and CAN transceivers that have different functionalities available to each of them, to be compatible with one another in that the signalling from the CAN controller to the CAN transceiver should activate the desired functionality rather than activate unintended functionality.

The use of the length of time in the logic zero state prior to a transition in the transmit data to select between the operation of the output impedance control with the first scheme or not operation of the output impedance control with the first scheme may be advantageous. Thus, the output impedance control with the first scheme can still be provided for CAN controllers that do not have the ability to provide bit times shorter than the predetermined threshold. However, CAN controllers that may wish to use greater baud rates (and therefore do have the ability to provide bit times shorter than the predetermined threshold) and may not want the first scheme impedance control to be activated, can signal this to the CAN transceiver 600 effectively.

Using this methodology to enable the transmit data to have higher baud rates may be particularly advantageous because the predetermined threshold time can be selected to be shorter than the shortest bit time provided for by a legacy protocol. Thus, for example, CAN FD has a maximum baud rate of 8 Mbps which gives a shortest bit time of 125 ns. If it is desired to signal, to the CAN transceiver from the CAN controller, the use of a baud rate higher than the maximum baud rate of CAN FD it may be advantageous to do this using predetermined threshold time less than 125 ns, because a legacy controller will not provide signalling with bit times shorter than 125 ns and the new functionality can be reliably signalled while maintaining backward compatibility.

In one or more examples the signalling detector may be provided by a digital signal processor configured to determine the bit time preceding a logic 0 to logic 1 transition and control the impedance control device accordingly. However, in this example, the signalling detector comprises the time filter 612 configured to provide a switching signal based on said length of time being one of longer or shorter than the predetermined threshold, wherein the signalling detector further comprises a multiplexer 613 configured to receive said switching signal and, based on the switching signal, switch between:
a first state in which the multiplexer is configured to connect a first control block 614 to provide signalling to the remainder of the impedance control device for provision of the first scheme; and
a second state in which the multiplexer is configured to either: connect a second control block 615 to provide signalling to the remainder of the impedance control device for provision of the second scheme; or disconnect the first control block 615 from the impedance control device.

Thus, example FIG. 6 shows an arrangement in which either the first control block 614 or the second control block 615 is connected to the impedance control device to provide the control in accordance with the first scheme or second scheme respectively. FIG. 6 shows an embodiment in which based on the length of time being shorter than said predetermined threshold, the signalling detector 612, 613 is configured to provide for control of said output impedance in accordance with the second scheme provided by control block 615.

Figure 7:
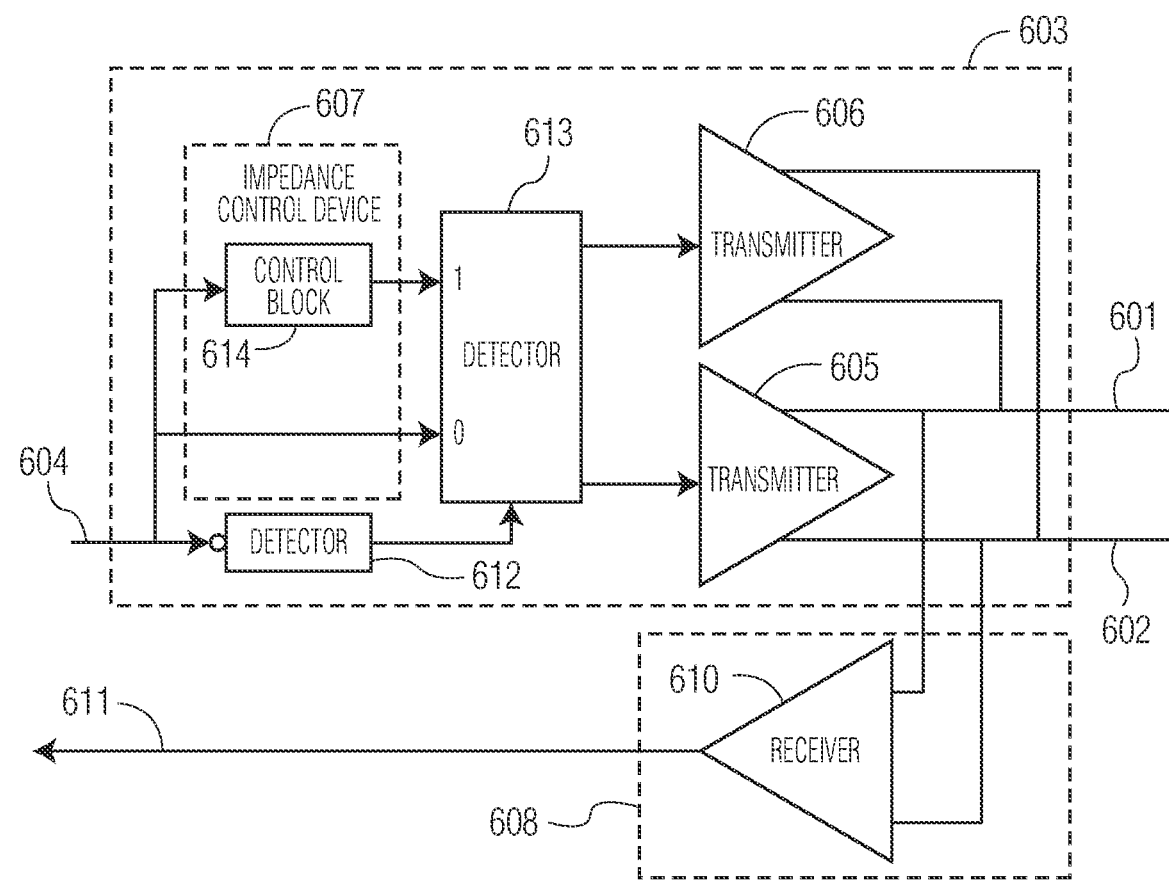
FIG. 7 shows a second example transceiver according to the disclosure.

Example FIG. 7 is substantially similar to FIG. 6 and the same numerals have been used. However, in this example, there is no second control block 615 and therefore the multiplexer 613 acts to disconnect the first control block 614 from the impedance control device. The transmitter arrangement 603 is then configured to transmit the signalling to the bus based on the transmit data without active control of the impedance by the impedance control device.

In one or more examples the impedance control in accordance with the first scheme may be provided by the second transmitter 606. Thus, based on the length of time being shorter than said predetermined threshold, the signalling detector 612, 613 may be configured to deactivate the second transmitter 606.

The first scheme has already been described in relation to FIG. 5, however, a summary is provided below. With reference to example FIG. 5, the first scheme comprises the following impedance control within a recessive bit duration 500 initiated by said transition 501 from a logic 0 in the transmit data (which causes the transmitter arrangement to apply the dominant state to the bus) at 502 to the logic 1 in the transmit data (to cause the transmitter arrangement to apply the recessive state to the bus) in the transmit data at 604.

Firstly, the output impedance of the impedance control device is controlled to be within the predefined range of an impedance value at the dominant state $R_{DOM}$ while the differential voltage on the CAN bus decreases to the predefined voltage within a first predetermined duration of time between $t_0$ to $t_1$. Thus, while the $V_{CAN}$ differential voltage over the bus is decreased from $V_{DOM}$ to 0 Volts, the output impedance $Z_{CAN}$ is maintained substantially at $R_{DOM}$. The predefined voltage comprises the differential bus voltage that represents the recessive state. The output impedance of the impedance control device may be controlled to be within the predefined range of an impedance value at the dominant state $R_{DOM}$ directly after the differential driver voltage on the CAN bus has decreased to the predefined voltage within between $t_1$ to $t_2$.

Subsequently, the impedance control device may be configured to increase the output impedance to a characteristic impedance of the CAN bus $R_{ACTREC}$ while the differential voltage on the CAN bus $V_{CAN}$ is kept at the predefined voltage (e.g. 0V) within a second predetermined duration of time between $t_2$ to $t_3$, after the first predetermined duration of time.

Subsequently, the impedance control device may be configured to maintain the output impedance to the characteristic impedance of the CAN bus for a third predetermined duration of time t3 to t4.

Subsequently, the impedance control device may be configured to increase the output impedance from the characteristic impedance $R_{ACTREC}$ of the CAN bus to a higher ohmic value $R_{REC}$ while the differential voltage on the CAN bus is kept at the predefined voltage within a fourth predetermined duration of time t4 to t5 after the third predetermined duration of time (t2 to t3). The impedance value of $R_{REC}$ may be greater than 1 kOhms or greater than 1 MOhms.

It will be appreciated that the first control block 614 may provide signalling to the impedance bridge to control the output impedance of the CAN transceiver to be within a certain percentage above or below the impedance value at the dominant state (and other impedance values described above).

Figure 8:
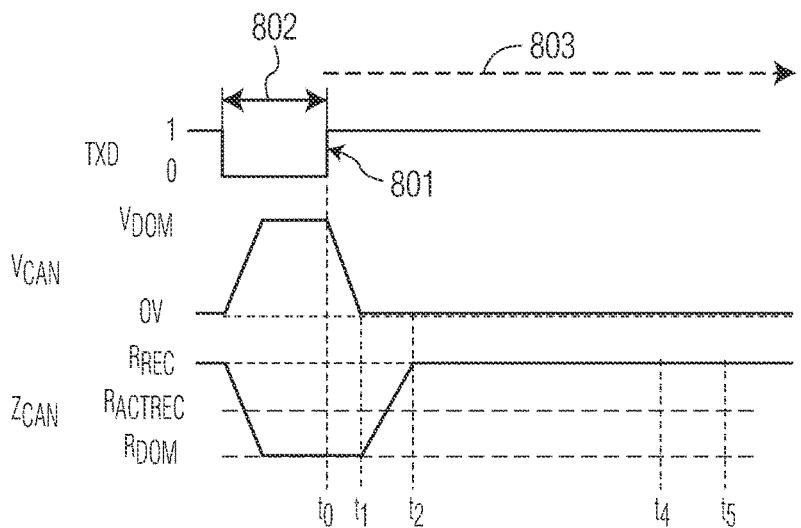
FIG. 8 shows an example signal timing diagram illustrating the operation of the transceiver depicted in FIG. 6.

An example of operation of the embodiment of FIG. 6 is shown in FIG. 8. In this example, the signalling detector detects the transition from logic zero to logic one in the transmit data at 801. The length of time 802 the transmit data comprises a logic zero state prior to the transition at 801 is shorter than said predetermined threshold in this example figure. Therefore, the signalling detector connects the second control block 615 to the impedance control block to provide the second scheme.

In general terms, the second scheme comprises controlling the output impedance to be within a predefined range of an impedance value at the dominant state while a differential voltage on the CAN bus decreases to a predefined voltage (between $t_0$ and $t_1$ in FIG. 8) and then increasing the output impedance over a second predetermined time duration ($t_1$ to $t_2$ in FIG. 8) that is shorter than the first predetermined time duration over which the output impedance is increased in the first scheme, shown as $t_2$ to $t_5$ in FIG. 5. The second predetermined time duration comprises the time taken to reach the greatest output impedance provided by the impedance control device over the bit time 803, i.e. $R_{REC}$.

In more detail, the second scheme may firstly comprise controlling an output impedance of the impedance control device to be within the predefined range of an impedance value at the dominant state while the differential voltage on the CAN bus decreases to the predefined voltage within a first predetermined duration of time shown as $t_0$ to $t_1$ in FIG. 8.

The second scheme may subsequently comprise increasing the output impedance of the impedance control device directly to the high impedance $R_{REC}$ comprising an impedance higher than the characteristic impedance of the CAN bus $R_{ACTREC}$ while the differential voltage on the CAN bus is kept at the predefined voltage within a second predetermined duration ($t_1$ to $t_2$) of time in FIG. 8 after the first predetermined duration of time and maintaining the high impedance for at least a remaining part or all of the recessive bit duration, that is after time $t_2$. It will be appreciated that the length of the recessive state of FIG. 8 may be shown longer than a single bit time for clarity.

Figure 9:
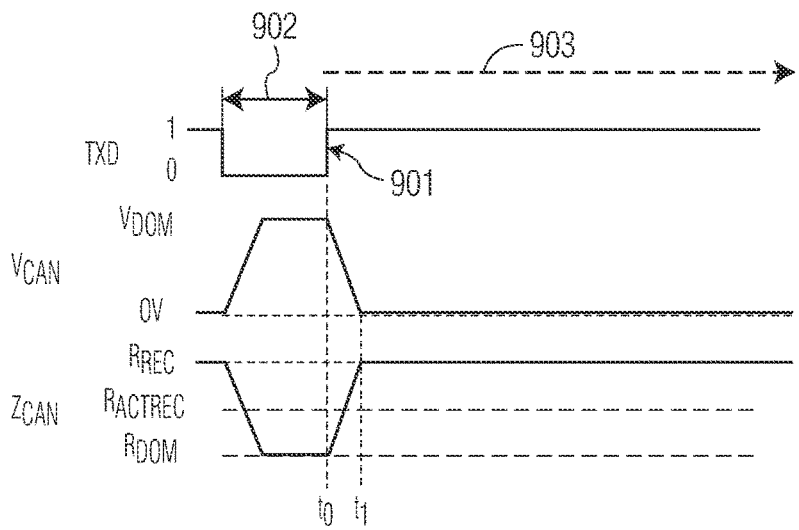
FIG. 9 shows an example signal timing diagram illustrating the operation of the transceiver depicted in FIG. 7.

An example of operation of the embodiment of FIG. 7 is shown in FIG. 9. In this example, the signalling detector detects the transition from logic zero to logic one in the transmit data at 901. The length of time 902 the transmit data comprises a logic zero state prior to the transition at 901 is shorter than said predetermined threshold in this example figure. In this example, there is no control of the output impedance by the impedance control device and therefore the transmitter arrangement causes the differential voltage on the CAN bus $V_{CAN}$ to decrease to the predefined voltage (representing the recessive state) within the first predetermined duration of time between $t_0$ to $t_1$. The output impedance $Z_{CAN}$ increases to the high value $R_{REC}$ during the same period.

It will be appreciated that the second scheme may be provided by the second control block controlling the impedance bridge of FIG. 5. As explained above, the impedance bridge may comprise two legs, and wherein each of the two legs comprises an adjustable pull resistor and an adjustable push resistor connected in series between a voltage supply rail and a ground rail and to a respective one of the two CAN bus terminals. The second control block 615 (and the first control block 614 in the earlier example) may provide signals to control the values of the adjustable resistors to provide the output impedance.

In a further example, the signalling detector being configured to determine the length of time the transmit data comprises a logic zero state prior to a transition in the transmit data from said logic zero state to a logic one state and may be configured to activate other functionality.

Thus, the transmitter arrangement may be configured to operate at any one time in a first transmit mode or a second transmit mode, wherein in the first transmit mode the transmitter arrangement is configured to transmit said signalling with a first property and when the transmitter arrangement is in the second transmit mode the transmitter arrangement is configured to transmit said signalling with a second property, different to the first property; wherein

- based on the length of time being longer than a predetermined threshold, as determined by the signalling detector, the transmitter arrangement is configured to operate in the first transmit mode; and
- based on the length of time being shorter than a predetermined threshold, as determined by the signalling detector, the transmitter arrangement is configured to operate in the second transmit mode.

The first property and the second property, in this example, comprise:

- a first baud rate used to transmit said signalling and a second baud rate used to transmit said signalling respectively, wherein the second baud rate is greater than the first baud rate; as well as
- a first voltage level scheme used to represent logic one and logic zero in the signalling applied to the CAN bus and a second voltage level scheme used to represent logic one and logic zero in the signalling applied to the CAN bus respectively, wherein voltage levels of the first voltage level scheme differ to the voltage levels of the second voltage level scheme.

In one or more examples, the first baud rate and the first voltage level scheme may be compliant with the CAN or CAN FD protocol. In one or more examples, the second baud rate may be greater than the maximum specified by the CAN FD protocol.

The switching between first and second transmit modes and first and second receive mode was described in detail in relation to FIGS. 1-3 above.

In one or more examples, a Controller Area Network, CAN, controller may be provided in combination with the CAN transceiver 600. The CAN controller comprises a transmit output node configured to provide transmit data to the CAN transceiver for transmission on the CAN bus and a receive input configured to receive received data from the CAN transceiver representative of received signalling from the CAN bus. The controller may also include, such as part of the microcontroller 110 or protocol controller 114 a functionality selector configured to provide a mode signal with the transmit data that instructs the CAN transceiver to operate in a second transmit mode rather than a first transmit mode and disable operation of the impedance control device in accordance with the first scheme, wherein the mode signal comprises the controller being configured to provide transmit data comprising a logic zero state having a length of time less than the predetermined threshold prior to a transition in the transmit data from said logic zero state to a logic one state.

The CAN controller may be configured to provide the transmit data at a second baud rate when the transceiver is in the second transmit mode which is greater than a first baud rate used when the transceiver is in the first transmit mode. In one or more examples, the second baud rate is such that a bit time of the second baud rate is less than the predetermined threshold used by the signalling detector. However, in other examples the bit time of the second baud rate is equal to or greater than the predetermined threshold used by the signalling detector.

The CAN controller may be configured to, when the mode signal is not provided, provide the transmit data at the first baud rate wherein the first baud rate is such that a bit time of the first baud rate is greater than the predetermined threshold, which thereby provides for operation of the impedance control device in accordance with the first scheme.

Figure 10:
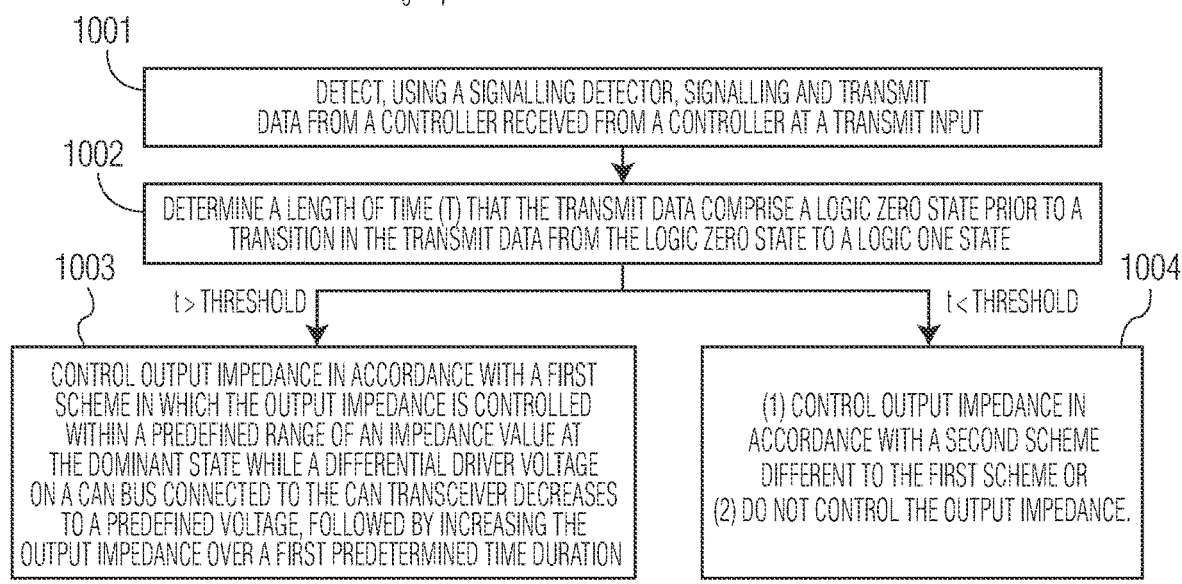
FIG. 10 shows an example flowchart illustrating a method of the disclosure.

FIG. 10 shows an example method for operating a Controller Area Network, CAN, transceiver, the CAN transceiver comprising two bus terminals 601, 602 for coupling said transceiver to a CAN bus and a transmitter arrangement 603 configured to transmit signalling on the CAN bus via said bus terminals based on transmit data received at a transmit input 604, the transmit input 604 comprising a terminal for coupling to a CAN controller, the transmitter arrangement comprising at least one transmitter configured to drive the bus to a dominant state or to a recessive state based on the transmit signal, and comprising an impedance control device connected to the two bus terminals; the method comprising:

- detecting 1001, using a signalling detector, signalling from the controller received at the transmit input with the transmit data;
- determining 1002 the length of time the transmit data comprises a logic zero state prior to a transition in the transmit data from said logic zero state to a logic one state and:
- based on the length of time being longer than a predetermined threshold, providing 1003 for control of an output impedance by the impedance control device in accordance with a first scheme comprising the controlling the output impedance to be within a predefined range of an impedance value at the dominant state while a differential driver voltage on a CAN bus connected to the CAN transceiver decreases to a predefined voltage and then increasing the output impedance over a first predetermined time duration; and
- based on the length of time being shorter than said predetermined threshold, providing 1004 for one of: control of said output impedance in accordance with a second scheme different to the first scheme; and no control of the output impedance by the impedance control device.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A Controller Area Network (CAN) transceiver comprising:
   two bus terminals for coupling said transceiver to a CAN bus;
   a transmitter arrangement configured to transmit signalling on the CAN bus via said bus terminals based on transmit data received at a transmit input, the transmit input comprising a terminal for coupling to a CAN controller, the transmitter arrangement comprising at least one transmitter configured to drive the CAN bus to a dominant state or to a recessive state based on the transmit signal, and comprising an impedance control device connected to the two bus terminals;
   a signalling detector configured to detect signalling from the controller received at the transmit input with the transmit data, the signalling detector configured to determine a length of time the transmit data comprises a logic zero state prior to a transition in the transmit data from said logic zero state to a logic one state and:
   based on the length of time being longer than a predetermined threshold, provide for control of an output impedance by the impedance control device in accordance with a first scheme comprising the controlling the output impedance to be within a predefined range of an impedance value at the dominant state while a differential driver voltage on a CAN bus connected to the CAN transceiver decreases to a predefined voltage and then increasing the output impedance over a first predetermined time duration; and
   based on the length of time being shorter than said predetermined threshold, provide for one of: control of said output impedance in accordance with a second scheme different to the first scheme; and no control of the output impedance by the impedance control device;
   wherein the signalling detector comprises a time filter configured to provide a switching signal based on said length of time being one of longer or shorter than the predetermined threshold, wherein the signalling detector further comprises a multiplexer configured to receive said switching signal and, based on the switching signal, switch between:
   a first state in which the multiplexer is configured to connect a first control block to provide signalling to the impedance control device for provision of the first scheme; and
   a second state in which the multiplexer is configured to either: connect a second control block to provide signalling to the impedance control device for provision of the second scheme; or disconnect the first control block from the impedance control device.

2. The transceiver of claim 1, wherein based on the length of time being shorter than said predetermined threshold, the signalling detector is configured to provide for control of said output impedance in accordance with the second scheme.

3. The transceiver of claim 1, wherein the transmitter arrangement comprises a first transmitter configured apply a voltage at the bus terminals to increase a potential difference between the at least two wires of the CAN bus to the dominant state and a second transmitter configured apply a voltage at the bus terminals to decrease the potential difference between the at least two wires of the bus towards the recessive state, wherein:
   based on the length of time being shorter than said predetermined threshold, the signalling detector is configured to deactivate the second transmitter.

4. The transceiver of claim 1, wherein the predetermined threshold is less than 125 ns.

5. The transceiver of claim 1, wherein the first scheme comprises, within a recessive bit duration initiated by said transition, which causes the transmitter arrangement to drive the bus from the dominant state to the recessive state:
   controlling the impedance control device to provide an output impedance to be within the predefined range of an impedance value at the dominant state while the differential voltage on the CAN bus decreases to the predefined voltage representative of the recessive state within a first predetermined duration of time; and
   subsequently, increasing the output impedance of the impedance control device to a characteristic impedance of the CAN bus while the differential driver voltage on the CAN bus is kept at the predefined voltage within a second predetermined duration of time after the first predetermined duration of time and maintaining the output impedance of the impedance control device to the characteristic impedance of the CAN bus for a third predetermined duration of time; and subsequently, increasing the output impedance of the CAN transceiver from the characteristic impedance of the CAN bus to a higher ohmic value while the differential driver voltage on the CAN bus is kept at the predefined voltage within a fourth predetermined duration of time after the third predetermined duration of time.

6. The transceiver of claim 1, wherein the second scheme comprises, within a recessive bit duration initiated by said transition, which causes the transmitter arrangement from the dominant state to the recessive state:

controlling an output impedance of the impedance control device to be within the predefined range of an impedance value at the dominant state while the differential voltage on the CAN bus decreases to the predefined voltage within a first predetermined duration of time of the second scheme; and subsequently, increasing the output impedance of the impedance control device directly to a high impedance comprising an impedance higher than a characteristic impedance of the CAN bus while the differential voltage on the CAN bus is kept at the predefined voltage within a second predetermined duration of time of the second scheme after the first predetermined duration of time and maintaining the high impedance for at least a remaining part or all of the recessive bit duration.

7. The transceiver of claim 1, wherein the impedance control device comprises an impedance bridge comprising two legs, and wherein each of the two legs comprises an adjustable pull resistor and an adjustable push resistor connected in series between a voltage supply rail and a ground rail and to a respective one of the two bus terminals.

8. The transceiver of claim 1, wherein the transceiver includes a receiver arrangement coupled to said two bus terminals and configured to receive signalling from the CAN bus, generate a digital, received data based on said signalling and provide said received data to a receive output, the receive output for coupling to the CAN controller.

9. A Controller Area Network (CAN) transceiver comprising:

two bus terminals for coupling said transceiver to a CAN bus;

a transmitter arrangement configured to transmit signalling on the CAN bus via said bus terminals based on transmit data received at a transmit input, the transmit input comprising a terminal for coupling to a CAN controller, the transmitter arrangement comprising at least one transmitter configured to drive the CAN bus to a dominant state or to a recessive state based on the transmit signal, and comprising an impedance control device connected to the two bus terminals;

a signalling detector configured to detect signalling from the controller received at the transmit input with the transmit data, the signalling detector configured to determine a length of time the transmit data comprises a logic zero state prior to a transition in the transmit data from said logic zero state to a logic one state and:

based on the length of time being longer than a predetermined threshold, provide for control of an output impedance by the impedance control device in accordance with a first scheme comprising the controlling the output impedance to be within a predefined range of an impedance value at the dominant state while a differential driver voltage on a CAN bus connected to the CAN transceiver decreases to a predefined voltage and then increasing the output impedance over a first predetermined time duration; and based on the length of time being shorter than said predetermined threshold, provide for one of: control of said output impedance in accordance with a second scheme different to the first scheme; and no control of the output impedance by the impedance control device;

wherein the transmitter arrangement is configured to operate at any one time in a first transmit mode or a second transmit mode, wherein in the first transmit mode the transmitter arrangement is configured to transmit said signalling with a first property and when the transmitter arrangement is in the second transmit mode the transmitter arrangement is configured to transmit said signalling with a second property, different to the first property;

wherein, based on the length of time being longer than a predetermined threshold, as determined by the signalling detector, the transmitter arrangement is configured to operate in the first transmit mode; and wherein, based on the length of time being shorter than a predetermined threshold, as determined by the signalling detector, the transmitter arrangement is configured to operate in the second transmit mode.

10. The transceiver of claim 9, wherein the first property and the second property comprise one or more of:

a first baud rate used to transmit said signalling and a second baud rate used to transmit said signalling respectively, wherein the second baud rate is greater than the first baud rate;

a first voltage level scheme used to represent logic one and logic zero in the signalling applied to the CAN bus and a second voltage level scheme used to represent logic one and logic zero in the signalling applied to the CAN bus respectively, wherein voltage levels of the first voltage level scheme differ to the voltage levels of the second voltage level scheme.

11. A system comprising a CAN controller in combination with a CAN transceiver;

wherein the CAN transceiver comprises:

two bus terminals for coupling said transceiver to a CAN bus;

a transmitter arrangement configured to transmit signalling on the CAN bus via said bus terminals based on transmit data received at a transmit input, the transmit input comprising a terminal for coupling to a CAN controller, the transmitter arrangement comprising at least one transmitter configured to drive the CAN bus to a dominant state or to a recessive state based on the transmit signal, and comprising an impedance control device connected to the two bus terminals;

a signalling detector configured to detect signalling from the controller received at the transmit input with the transmit data, the signalling detector configured to determine a length of time the transmit data comprises a logic zero state prior to a transition in the transmit data from said logic zero state to a logic one state and:

based on the length of time being longer than a predetermined threshold, provide for control of an output impedance by the impedance control device in accordance with a first scheme comprising the controlling the output impedance to be within a predefined range of an impedance value at the dominant state while a differential driver voltage on a CAN bus connected to the CAN transceiver decreases to a predefined voltage and then increasing the output impedance over a first predetermined time duration; and based on the length of time being shorter than said predetermined threshold, provide for one of: control of said output impedance in accordance with a second scheme different to the first scheme; and no control of the output impedance by the impedance control device; and wherein the CAN controller comprises:
a transmit output configured to provide transmit data to the CAN transceiver for transmission on the CAN bus;

a receive input configured to receive received data from the CAN transceiver representative of received signalling from the CAN bus; and a functionality selector configured to provide a mode signal with the transmit data that instructs the CAN transceiver to operate in a second transmit mode rather than a first transmit mode and disable operation of the impedance control device in accordance with the first scheme, wherein providing the mode signal comprises the controller being configured to provide transmit data comprising a logic zero state having a length of time less than the predetermined threshold prior to a transition in the transmit data from said logic zero state to a logic one state.

12. The system of claim 11, wherein the CAN controller is configured to provide the transmit data at a second baud rate when the transceiver is in the second transmit mode which is greater than a first baud rate used when the transceiver is in the first transmit mode, and wherein the second baud rate is such that a bit time of the second baud rate is less than the predetermined threshold.

13. The system of claim 11, wherein the CAN controller is configured to, when the mode signal is not provided, provide the transmit data at the first baud rate wherein the first baud rate is such that a bit time of the first baud rate is greater than the predetermined threshold, which thereby provides for operation of the impedance control device in accordance with the first scheme.

14. A method for operating a Controller Area Network, CAN, (CAN) transceiver, the CAN transceiver comprising two bus terminals for coupling said transceiver to a CAN bus and a transmitter arrangement configured to transmit signalling on the CAN bus via said bus terminals based on transmit data received at a transmit input, the transmit input comprising a terminal for coupling to a CAN controller, the transmitter arrangement comprising at least one transmitter configured to drive the bus to a dominant state or to a recessive state based on the transmit signal, and comprising an impedance control device connected to the two bus terminals; the method comprising:

detecting, using a signalling detector, signalling from the controller received at the transmit input with the transmit data;

determining a length of time the transmit data comprises a logic zero state prior to a transition in the transmit data from said logic zero state to a logic one state and:

based on the length of time being longer than a predetermined threshold, providing for control of an output impedance by the impedance control device in accordance with a first scheme comprising the controlling the output impedance to be within a predefined range of an impedance value at the dominant state while a differential driver voltage on a CAN bus connected to the CAN transceiver decreases to a predefined voltage and then increasing the output impedance over a first predetermined time duration; and based on the length of time being shorter than said predetermined threshold, providing for one of: control of said output impedance in accordance with a second scheme different to the first scheme; and no control of the output impedance by the impedance control device;

wherein the signalling detector comprises a time filter configured to provide a switching signal based on said length of time being one of longer or shorter than the predetermined threshold, wherein the signalling detector further comprises a multiplexer configured to receive said switching signal and, based on the switching signal, switch between:

a first state in which the multiplexer is configured to connect a first control block to provide signalling to the impedance control device for provision of the first scheme; and a second state in which the multiplexer is configured to either: connect a second control block to provide signalling to the impedance control device for provision of the second scheme; or disconnect the first control block from the impedance control device.

* * * * *